Sept. 26, 1961          C. M. VERHAGEN ET AL          3,001,248
                          DOUBLE GLAZED SASH
Filed May 2, 1960                                   2 Sheets-Sheet 1
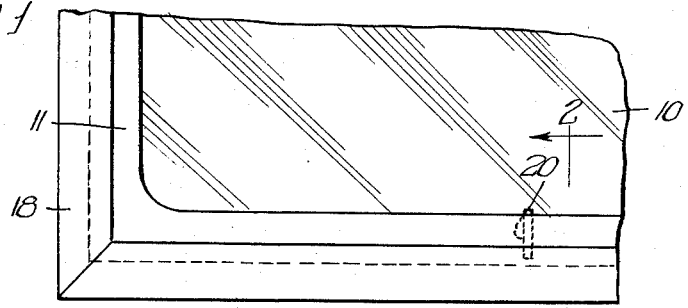
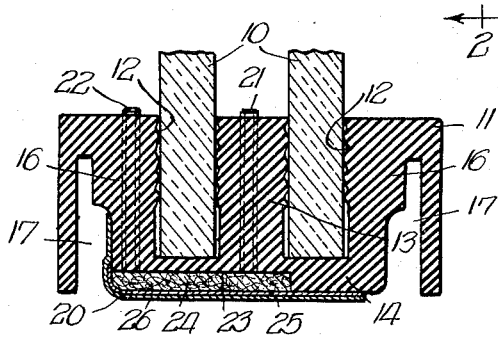
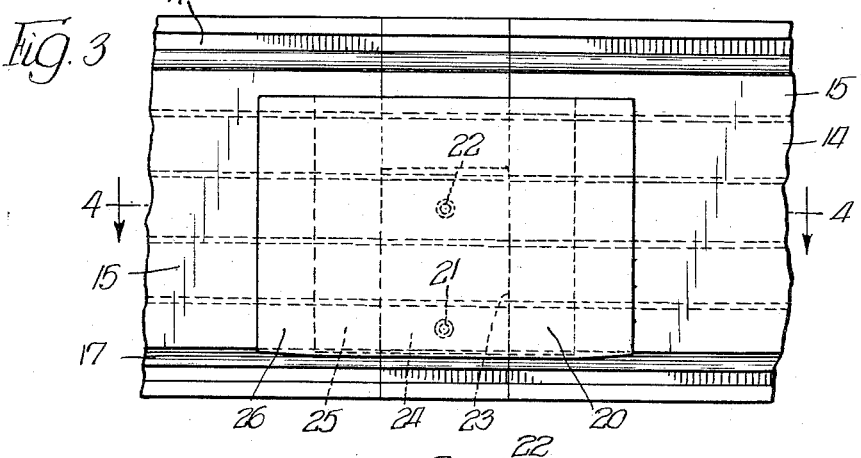
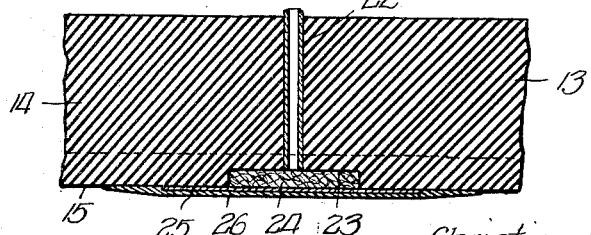
INVENTORS
Christian M. Verhagen,
BY Yale W. Ehret,
Cromwell, Greist & Warden
attys.

Sept. 26, 1961 C. M. VERHAGEN ET AL 3,001,248
DOUBLE GLAZED SASH
Filed May 2, 1960 2 Sheets-Sheet 2
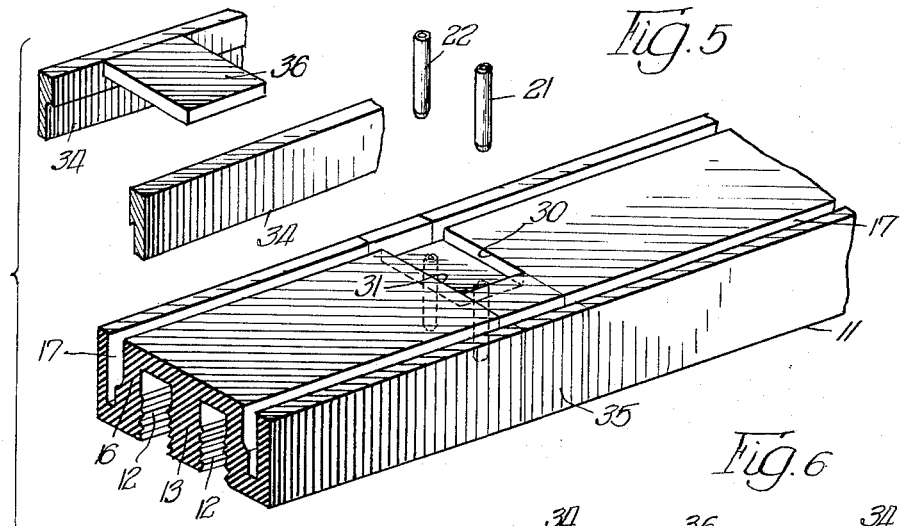
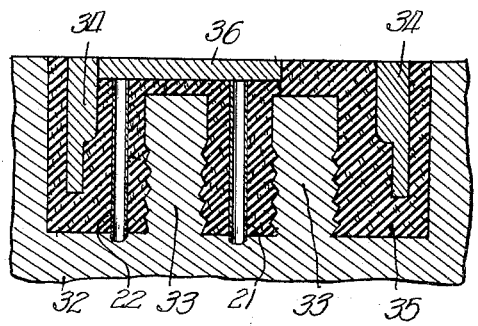
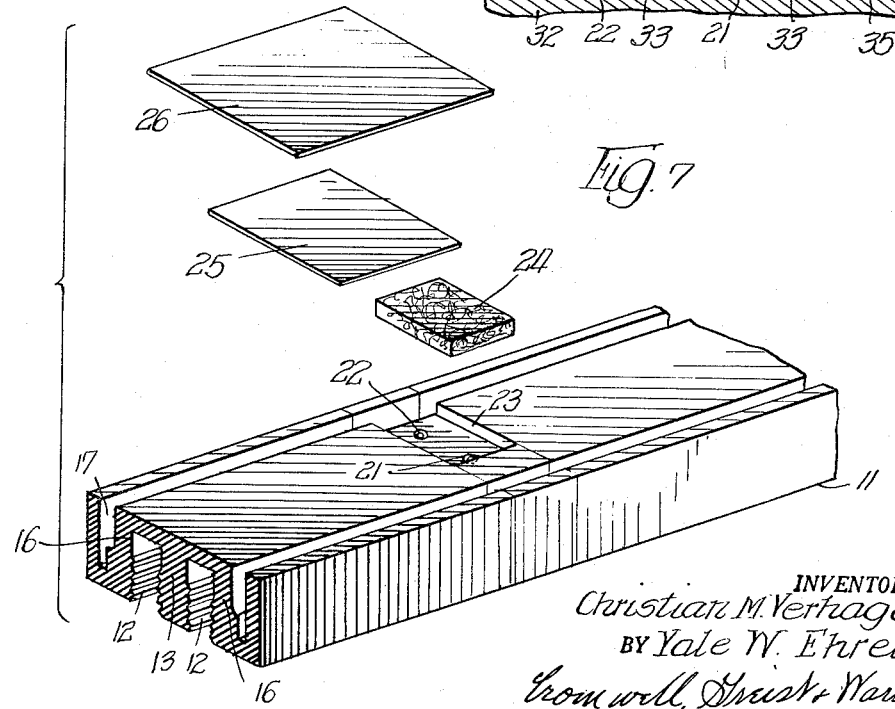
INVENTOR.
Christian M. Verhagen,
BY Yale W. Ehret,
Cromwell, Greist & Warden
Attys.

United States Patent Office 3,001,248
Patented Sept. 26, 1961

3,001,248
DOUBLE GLAZED SASH
Christian M. Verhagen and Yale W. Ehret, Elkhart, Ind., assignors to The Adlake Company, Elkhart, Ind., a corporation of Illinois
Filed May 2, 1960, Ser. No. 26,236
9 Claims. (Cl. 20—56.5)

This invention relates generally to the fabrication of double glass sash of the type commonly employed in the windows of air conditioned busses, railway cars and the like. The invention is particularly concerned with improvements in the glazing unit which surrounds the edges of the sash and the breather arrangement for venting the otherwise sealed space present between the panes of glass.

It is a general object of the invention to provide an improved double glass sash and a method of fabricating the same wherein a glazing unit of rubber or similar material is formed for encompassing the edges of the sash and sealing the space between the panes and wherein the glazing unit incorporates an improved form of breathing device.

It is a more specific object to provide in a double glass sash having an edge encompassing glazing unit of rubber or like material wherein a pair of needle-like breather tubes are embedded in the glazing unit with one of the tubes extending in a portion of the glazing unit which separates the panes and the other one of the tubes extending in a parallel portion of the glazing unit which is on the outside of the sash and wherein a filter pad extends between the outer ends of the tubes and is covered by a patch of sealing material which is secured to the exterior surface of the glazing unit to enclose the filter pad in a pocket forming a connecting passageway between the ends of the breather tubes.

It is a further object of the invention to provide a double glass sash and a method of forming the same wherein the edges of the panes are confined within the channels of a glazing unit which is fabricated from a strip of molded rubber or similar material and provided with a pair of breather tubes which are inserted in the joint forming area between the ends of the strip and molded therein while forming the joint, the joint being formed with a recess into which the outer ends of the breather tubes extend and which receives a filter pad, the latter being covered by a protective patch of balloon cloth and the filter pad and its protective patch being enclosed in the recess by a sealing material which is vulcanized to the glazing strip around the edges of the recess.

These and other objects and advantages of the invention will be apparent from a consideration of the sash structure and the method of fabricating the same which is shown by way of illustration in the accompanying drawings wherein:

FIGURE 1 is a partial elevation of a window sash having a glazing unit with a breather device incorporated therein which embodies the principles of the invention;

FIGURE 2 is a section taken on the line 2—2 of FIGURE 1, to an enlarged scale;

FIGURE 3 is a partial plan view of the outside edge forming face of the glazing unit at the molded joint where the breather device is incorporated;

FIGURE 4 is a section taken on the line 4—4 of FIGURE 3;

FIGURE 5 is an exploded perspective view illustrating the intial steps involved in the fabrication of the joint connecting the ends of the glazing strip and incorporating therein the breather device;

FIGURE 6 is a cross section, to an enlarged scale, taken through the joint area, with the joint forming material and certain of the mold elements in position preparatory to the initial vulcanizing operation; and FIGURE 7 is an exploded perspective view illustrating further steps in assembling the breather elements with the glazing strip preparatory to the final vulcanizing operation.

Referring to FIGURES 1 to 3 of the drawings, the sash construction illustrated comprises two spaced panes of glass 10, a glazing unit 11 which extends about the four sides of the sash along the edges of the panes and which is formed of a strip of molded rubber or other material having similar characteristics. The glazing unit 11 extends along the edges of the panes 10 and is provided with grooves 12 in which such edges are supported with a spacer rib 13 extending between the two grooves 12 so as to engage with the marginal portions of the opposed inner faces of the two glass panes 10 and hold the same in separated or spaced relation. The glazing unit 11 includes a base portion 14 having an outside edge face 15 which extends between the outer edges of two outside wall forming sections 16, the latter being parallel with the rib forming section 13 and spaced therefrom laterally so as to engage with marginal edge portions of the outside faces of the two glass panes. Each of the outside wall sections 16 is provided with a longitudinally extending recess or groove 17 which opens on the edge face 15 and is adapted to receive portions of the sash rail 18. The glazing unit 11 is provided with a built in breather arrangement 20 which comprises a pair of breather tubes 21 and 22 embedded in the spacer rib 13 and one of the outside walls 16, respectively. The inner end of the innermost tube 21 opens in the area between the glass panes while the corresponding end of the outermost tube 22 opens adjacent the outermost face of one pane of the sash. The opposite or outer ends of the tubes 21 and 22 open into a pocket forming recess 23 in the outer edge face of the glazing strip and are covered by a filter pad 24 which is set in the recess 23. The recess 23 is formed in the edge face 15 of the glazing strip between the grooves 17 and is of a dimension in the direction transversely of the glazing unit which is sufficient to form a connecting passageway between the spaced outer ends of the needle-like breather tubes 21 and 22. The recess 23 and the filter pad 24 are covered by a patch of balloon cloth 25 and the latter is held in place by a patch 26 of the glazing strip material which is vulcanized to the surface areas of the glazing unit adjoining the recess 23 so that the filter pad 24 is completely enclosed and sealed in the recess 23. With this arrangement, the air pocket between the panes 10 is vented to the atmosphere through a passageway in which the wad of filter material or felt pad 24 is positioned.

The glazing unit 11 is initially formed from a continuous strip of molded rubber or other material having rubber-like properties. A section of the strip material is formed into a glazing unit for asscciation with the edges of the glass panes 10 by forming a joint structure between the cut ends 30 and 31 (FIGURE 5) with the joint being fabricated by an injection molding operation and the breather elements being incorporated in the connecting joint area.

In forming the joint (FIGURES 5 to 7) the two ends 30 and 31 of the glazing strip member are set in a mold, indicated at 32 in FIGURE 6, in spaced apart relation as indicated in FIGURE 5, the mold having filler ribs 33 for the grooves 12. Filler strips 34 are then set in the grooves 17 and the small tube sections which constitute the breather tubes 21 and 22 are supported in the joint forming area between the ends of the center rib section 13 and one of the side wall sections 16, respectively, in a well known manner, while a mass of suitable joint forming material 35, such as an uncured rubber, when the glazing strip is formed of rubber, is packed in the joint area with a mold insert 36 being placed over the ends of the tubes 21 and 22 so as to form the recess 23 for receiving the filter pad 24. The mold insert 36 for forming the recess 23 is positioned in the area of the joint and between the two ends 30 and 31 of the glazing strips. The joint prepared in this manner is then subject to an injection molding operation to cure the wad of uncured rubber and connect the two ends 30 and 31 of the glazing strip with the breather tubes 21 and 22 being embedded in the material forming the connection at the joint. Thereafter, the assembly is removed from the mold, leaving the same in the condition shown in FIGURE 7. The filter pad is then inserted in the recess 24 after inspecting the tubes 21 and 22 to insure that they have not been plugged by rubber during the molding operation. A small patch of balloon cloth 25 which has previously been prepared is placed over the felt pad 24. The balloon cloth patch 25 is formed from a nylon cloth material and has previously been treated on both sides with a rubber vulcanizing cement. The margins of the patch 25 extend slightly beyond the margins of the felt pad 24. A patch 26 of vulcanizing material is then placed over the pad covering patch 25. The vulcanizing patch 26 is preferably formed of neoprene coated with a vulcanizing cement. The assembly is then subjected to a vulcanizing operation which seals the cloth covered pad 24 within the recess 23 and provides a filtering connection or passageway between the two outer ends of the breather tubes 21 and 22, the other ends of the latter terminating, of course, one within the space between the two panes and the other adjacent the outside surface of one of the panes when the glazing unit 11 and the panes 10 are assembled to form the sash unit.

We claim:

1. In a multiple glass sash, a rubber-like glazing unit having spaced glazing channels, panes of glass seated in the glazing channels, the glazing unit extending around the periphery of the glass panes and encompassing the margins thereof so as to seal the edges and form an air pocket between the panes, and a breather for venting said air pocket comprising a pair of needle-like breather tubes embedded in the glazing unit, one of said breather tubes having its inner end extending into the air pocket, the other one of said tubes having its inner end extending outside the panes, said glazing unit having a pocket forming recess in its outer edge, said tubes having their outer ends extending to said pocket forming recess, a cover member over said recess and said recess and cover member being completely enclosed by a seal forming patch vulcanized to the outer edge face of the glazing unit.

2. In a multiple glass sash, a continuous rubber-like glazing unit having laterally spaced, inwardly facing glazing grooves, panes of glass seated in the glazing grooves, the glazing unit having portions extending around the periphery of the glass panes and along the margins of said panes so as to seal the edges and form an air pocket between the panes, and a breather for venting said air pocket comprising needle-like breather tubes embedded in the glazing unit, one of the tubes having its inner end extending into the air pocket, another one of said tubes having its inner end extending outside the panes, said glazing unit having a pocket forming recess extending transversely thereof and inwardly of the outer edge face thereof, said tubes having their outer ends connecting with said pocket forming recess, a cloth cover patch having its margins extending beyond the edges of said pocket forming recess and sealed in position by a covering patch vulcanized to the outer edge face of the glazing unit.

3. In a multiple glass sash as recited in claim 2, and a wad of filter material seated in said recess.

4. In a multiple glass sash, a rubber glazing unit having laterally spaced, inwardly facing glazing channels, said glazing unit being formed from a molded rubber strip which has its ends connected by a joint forming section of rubber connected thereto by vulcanizing, panes of glass seated in the glazing channels, said glazing unit extending around the periphery of the glass panes and encompassing portions of the margins thereof so as to seal the edges and form an air pocket between the panes, and a breather for venting said air pocket comprising a pair of needle-like air tubes embedded in the joint forming section of rubber between the ends of the rubber strip forming the glazing unit, one of the tubes having an inner end extending into the air pocket, the other of said tubes having an inner end extending outside the panes, said joint forming section having a pocket opening outwardly of the edges of the panes, said tubes having their other ends extending to said pocket which forms a connecting passageway between the outer ends of said air tubes, a balloon cloth cover member positioned over the open face of said pocket and a neoprene patch covering said cover member and vulcanized to the outer edge face of the glazing unit.

5. A multiple glass sash comprising a rubber-like glazing unit having spaced glazing channels, panes of glass seated in spaced apart relation in the glazing channels, the glazing unit extending around the periphery of the glass panes and enclosing marginal portions of said panes so as to seal the edges and form an air pocket between the panes, and a breather for venting said air pocket comprising a pair of needle-like breather tubes embedded in the glazing unit, one of said tubes having its inner end communicating with said air pocket, the other of said tubes having its inner end communicating with the atmosphere outside the panes, said glazing strip having a relatively shallow passageway in its outer edge face, said tubes having their outer ends connected by said passageway, a felt pad in said passageway and forming an air filter, a nylon cloth patch covering said passageway and said felt pad and a neoprene patch vulcanized to the surface of the glazing unit so as to completely enclose and seal said pad and said covering patch.

6. A double glass sash comprising a glazing unit of resilient rubber-like material having spaced glazing channels opening inwardly thereof, panes of glass seated in the glazing channels, the glazing unit being formed of a continuous strip of material with its ends spaced apart by a joint forming section of material molded in connecting relation in the space therebetween, said glazing extending around the periphery of the glass panes and along the margins of said panes so as to seal the edges and form an air pocket between the panes, and a breather for venting said air pocket comprising a pair of needle-like breather tubes embedded in the joint forming section of the glazing unit, one of the tubes having an inner end extending into the air pocket, the other of said tubes having an inner end extending outside one of the panes, said tubes having their outer ends extending into a connecting pocket along the outer face of the joint forming section of the material, a filter pad in said pocket, a cloth cover member covering said pocket and the exposed portions of the filter pad, and a sealing and covering patch vulcanized to the material around the edges of the pocket.

7. A method of forming a glazing unit for a multiple glass sash from a strip of molded rubber which has parallel glazing grooves opening on one face thereof which method comprises forming a molded joint between spaced ends of said glazing strip by arranging a quantity of uncured rubber between the ends of the strip, placing a pair of needle-like breather tubes between said ends so that their inner ends extend slightly beyond the adjoining surfaces of the inner face of the glazing unit and their outer ends extending through the uncured rubber, placing a mold insert in the space between the glazing strip ends and against the outer ends of the breather tubes so as to extend between said tube ends, vulcanizing the uncured rubber to form the joint with the breather tubes embedded therein, removing the mold insert so as to leave a connecting pocket between the outer ends of the breather tubes, placing a filter pad in the pocket, covering the pocket with a protective patch of cloth material, covering the protective patch with a seal forming vulcanizing patch and vulcanizing the same to completely enclose and seal the filter pad in the pocket.

8. A method of fabricating a glazing unit for a multiple glass sash from a strip of rubber-like material which is formed with parallel grooves forming channels for receiving the glass panes which method comprises arranging the two ends of the material in spaced relation in a suitable mold, packing a quantity of uncured joint material in the space between said ends, embedding a pair of needle-like breather tubes in the joint material so that their inner ends extend slightly beyond the adjoining surfaces of the inner face of the glazing unit covering the exposed ends of the breather tubes with a mold insert, vulcanizing the joint material to connect the ends of the glazing strip, removing the mold insert, placing a filter material in the recess resulting from the removal of the mold insert, placing a protective patch of cloth material over the filter material and the recess, placing a seal forming vulcanizing patch over the protective patch and vulcanizing the same to seal the edges thereof to the material around the edges of the recess, thereby enclosing and sealing the filter material in the recess.

9. A method of forming a glazing unit for a multiple glass sash from a continuous strip of glazing rubber which has parallel glazing grooves opening on the edge face which is adapted to form the inside of the glazing unit, which method comprises forming a joint between the ends of said glazing strip by arranging the ends in spaced relation, placing a quantity of uncured rubber in the space between said ends, placing a pair of needle-like breather tubes in the uncured rubber between said ends so that the inner ends of the breather tubes extend beyond the adjoining surfaces of the inner edge face of the glazing unit, placing a mold insert in the space between the glazing strip ends and against the outer ends of the breather tubes so as to extend between said tube ends, vulcanizing the rubber to form the joint, removing the mold insert so as to leave a connecting passageway between the outer ends of the breather tubes, placing a wad of filter material in the passageway, placing a protective patch of nylon cloth matrial over the open face of the passageway, placing a seal forming neoprene vulcanizing patch over the protective cloth patch and vulcanizing the same to completely enclose and seal the wad of filter material in the passageway.

References Cited in the file of this patent

UNITED STATES PATENTS

| | | |
|---|---|---|
| 2,345,643 | Verhagen | Apr. 4, 1944 |
| 2,583,343 | Rodman | Jan. 22, 1952 |
| 2,933,780 | Shinefeld | Apr. 26, 1960 |